(12) United States Patent
Cassidy et al.

(10) Patent No.: US 11,537,859 B2
(45) Date of Patent: Dec. 27, 2022

(54) FLEXIBLE PRECISION NEURAL INFERENCE PROCESSING UNIT

(71) Applicant: INTERNATIONAL BUSINESS MACHINES CORPORATION, Armonk, NY (US)

(72) Inventors: Andrew S. Cassidy, San Jose, CA (US); Rathinakumar Appuswamy, San Jose, CA (US); John V. Arthur, Mountain View, CA (US); Pallab Datta, San Jose, CA (US); Steve Esser, San Jose, CA (US); Myron D. Flickner, San Jose, CA (US); Jeffrey McKinstry, San Jose, CA (US); Dharmendra S. Modha, San Jose, CA (US); Jun Sawada, Austin, TX (US); Brian Taba, Cupertino, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 494 days.

(21) Appl. No.: 16/705,565

(22) Filed: Dec. 6, 2019

(65) Prior Publication Data

US 2021/0174176 A1  Jun. 10, 2021

(51) Int. Cl.
  *G06N 3/063*   (2006.01)
  *G06F 15/80*   (2006.01)
  *G06F 17/16*   (2006.01)
  *G06N 3/04*    (2006.01)

(52) U.S. Cl.
  CPC .......... *G06N 3/063* (2013.01); *G06F 15/8053* (2013.01); *G06F 17/16* (2013.01); *G06N 3/0481* (2013.01)

(58) Field of Classification Search
  None
  See application file for complete search history.

(56) References Cited

U.S. PATENT DOCUMENTS

| 2006/0217084 | A1* | 9/2006 | Gupta | ................. H04L 27/2657 455/125 |
| 2017/0316312 | A1* | 11/2017 | Goyal | .................. G06N 3/0454 |
| 2018/0046901 | A1* | 2/2018 | Xie | ...................... G06N 3/0445 |
| 2018/0165574 | A1* | 6/2018 | Young | ...................... G06N 3/04 |
| 2018/0174026 | A1 | 6/2018 | Davies | |
| 2018/0211152 | A1 | 7/2018 | Migacz et al. | |

(Continued)

FOREIGN PATENT DOCUMENTS

CN    108564168 A    9/2018

OTHER PUBLICATIONS

Lee, J., et al., UNPU: An Energy-Efficient Deep Neural Network Accelerator With Fully Variable Weight Bit Precision, 2018, IEEE, pp. 173-185 (Year: 2018).*

(Continued)

*Primary Examiner* — Eric Coleman
(74) *Attorney, Agent, or Firm* — Erik A. Huestis; Stephen J. Kenny; Foley Hoag. LLP

(57) ABSTRACT

Neural inference chips are provided. A neural core of the neural inference chip comprises a vector-matrix multiplier; a vector processor; and an activation unit operatively coupled to the vector processor. The vector-matrix multiplier, vector processor, and/or activation unit is adapted to operate at variable precision.

20 Claims, 18 Drawing Sheets

(56) References Cited

U.S. PATENT DOCUMENTS

2018/0307494 A1    10/2018  Ould-Ahmed-Vall et al.
2018/0322607 A1*   11/2018  Mellempudi ........ G06N 3/0454
2019/0138888 A1*    5/2019  Sekiyama ............ G06K 9/6274
2019/0303749 A1*   10/2019  Appuswamy ........... G06F 7/505
2019/0325314 A1*   10/2019  Bourges-Sevenier .......................
                                                G06N 3/063

OTHER PUBLICATIONS

International Search Report and Written Opinion for International Application No. PCT/EP2020/077251 dated Dec. 17, 2020.
Sahni, "8-Bit Quantization and TensorFlow Lite: Speeding up mobile inference with low precision," Heartbeat, published Jun. 24, 2018.

* cited by examiner

FLEXIBLE PRECISION NEURAL INFERENCE PROCESSING UNIT

This invention was made with Government support under FA8750-18-C-0015 awarded by U.S. Air Force, Office of Scientific Research. The government has certain rights to this invention.

BACKGROUND

Embodiments of the present disclosure relate to neural network processing units, and more particularly to flexible precision neural inference processing units.

BRIEF SUMMARY

According to embodiments of the present disclosure, neural inference chips are provided, comprising a neural core. The neural core comprises a vector-matrix multiplier adapted to receive a weight matrix having a weight matrix precision, receive an input activation vector having an input activation vector precision, and compute a partial sum vector by multiplying the input activation vector by the weight matrix, the partial sum vector having a partial sum vector precision. The neural core comprises a vector processor adapted to receive one or more partial sum vector from one or more vector source, the one or more vector source including the vector-matrix multiplier, and perform one or more vector function on the one or more partial sum vector to yield a vector processor output vector, the vector processor output vector having a precision equal to the partial sum vector precision. The neural core comprises an activation unit operatively coupled to the vector processor and adapted to apply an activation function to the vector processor output vector, yielding an output activation vector having an output activation precision. The vector-matrix multiplier, vector processor, and/or activation unit is adapted to operate at variable precision.

According to embodiments of the present disclosure, methods of and computer program products for flexible precision neural inference are provided. In various embodiments, a weight matrix having a first precision is received. An activation vector is received having the first precision. A vector-matrix multiplication is computed of the weight matrix and the activation vector, yielding a partial sum vector a second precision. One or more vector functions is performed on the partial sum vector to yield a vector processor output vector having the second precision. An activation function is applied to the vector processor output vector, yielding an output activation vector having a third precision. At least one of the first, second, and third precision is varied at runtime.

DETAILED DESCRIPTION

Figure 1:
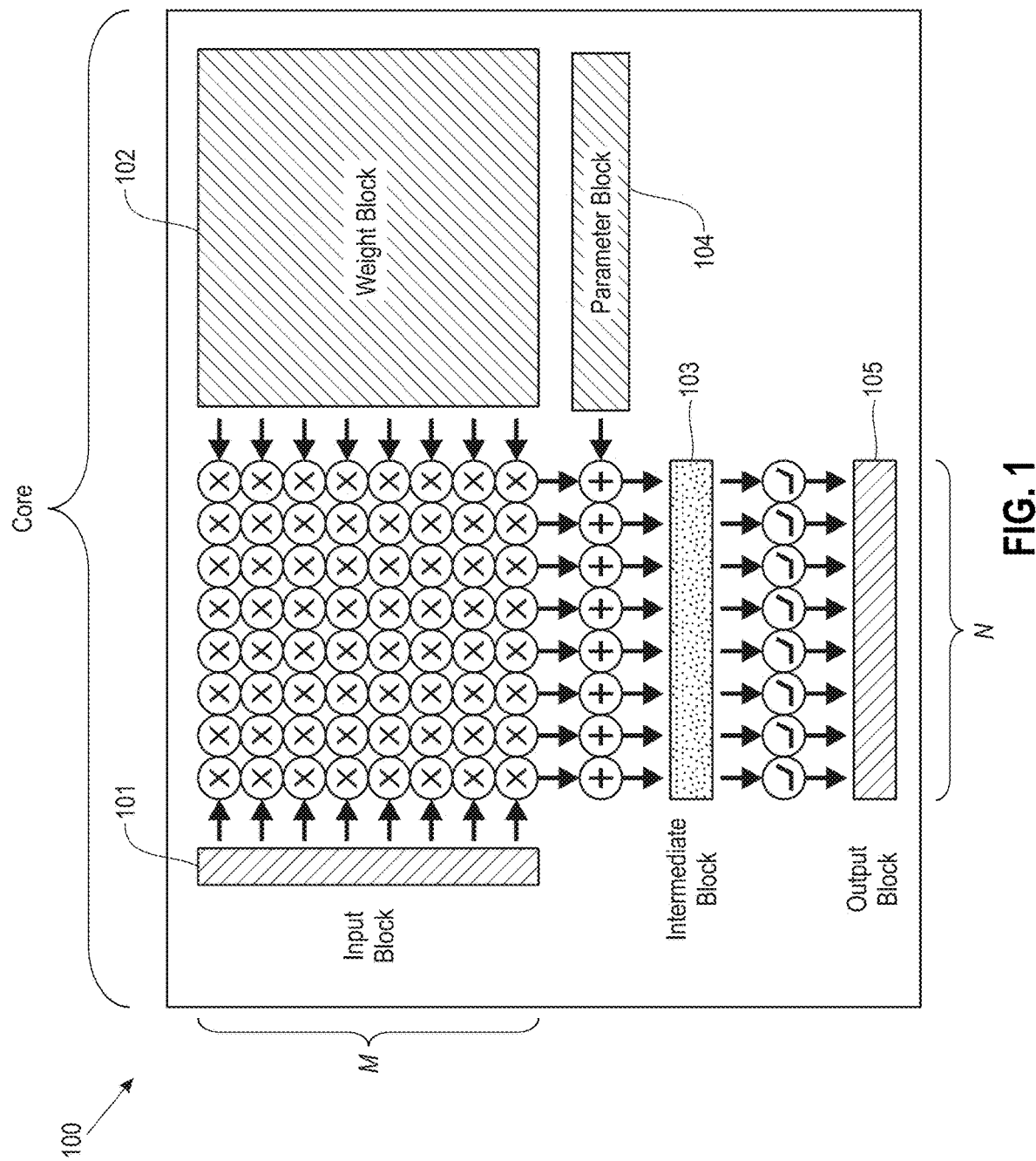
FIG. 1 illustrates a neural core according to embodiments of the present disclosure.

An artificial neuron is a mathematical function whose output is a nonlinear function of a linear combination of its inputs. Two neurons are connected if the output of one is an input to the other. A weight is a scalar value encoding the strength of the connection between the output of one neuron and the input of another neuron.

A neuron computes its output, called an activation, by applying a nonlinear activation function to a weighted sum of its inputs. A weighted sum is an intermediate result computed by multiplying each input with the corresponding weight and accumulating the products. A partial sum is a weighted sum of a subset of inputs. A weighted sum of all inputs may be computed in stages by accumulating one or more partial sums.

A neural network is a collection of one or more neurons. A neural network is often divided into groups of neurons called layers. A layer is a collection of one or more neurons that all receive input from the same layers and all send output to the same layers, and typically perform a similar function. An input layer is a layer that receives input from a source outside the neural network. An output layer is a layer that sends output to a target outside the neural network. All other layers are intermediate processing layers. A multilayer neural network is a neural network with more than one layer. A deep neural network is a multilayer neural network with many layers.

A tensor is a multidimensional array of numerical values. A tensor block is a contiguous subarray of the elements in a tensor.

Each neural network layer is associated with a parameter tensor V, weight tensor W, input data tensor X, output data tensor Y, and intermediate data tensor Z. The parameter tensor contains all of the parameters that control neuron activation functions a in the layer. The weight tensor contains all of the weights that connect inputs to the layer. The input data tensor contains all of the data that the layer consumes as input. The output data tensor contains all of the data that the layer computes as output. The intermediate data tensor contains any data that the layer produces as intermediate computations, such as partial sums.

The data tensors (input, output, and intermediate) for a layer may be 3-dimensional, where the first two dimensions may be interpreted as encoding spatial location and the third dimension as encoding different features. For example, when a data tensor represents a color image, the first two dimensions encode vertical and horizontal coordinates within the image, and the third dimension encodes the color at each location. Every element of the input data tensor X can be connected to every neuron by a separate weight, so the weight tensor W generally has 6 dimensions, concatenating the 3 dimensions of the input data tensor (input row a, input column b, input feature c) with the 3 dimensions of the output data tensor (output row i, output column j, output feature k). The intermediate data tensor Z has the same shape as the output data tensor Y. The parameter tensor V concatenates the 3 output data tensor dimensions with an additional dimension o that indexes the parameters of the activation function σ.

An element of a layer's output data tensor Y can be computed as in Equation 1 where the neuron activation function σ is configured by the vector of activation function parameters V[i, j, k, :], and the weighted sum Z[i, j, k] can be computed as in Equation 2.

$$Y[i, j, k] = \sigma(V[i, j, k, :]; Z[i, j, k]) \quad \text{Equation 1}$$

$$Z[i, j, k] = \sum_{a=1}^{A}\sum_{b=1}^{B}\sum_{c=1}^{C} W[i, j, k, a, b, c] \cdot X[a, b, c] \quad \text{Equation 2}$$

For simplicity of notation, the weighted sum in Equation 2 may be referred to as the output, which is equivalent to using a linear activation function Y[i, j, k]=σ(Z[i, j, k])=Z[i, j, k], with the understanding that the same statements apply without loss of generality when a different activation function is used.

In various embodiments, computation of the output data tensor as described above is decomposed into smaller problems. Each problem may then be solved on one or more neural core, or on one or more core of a conventional multicore system in parallel.

With reference now to FIG. 1, a neural core according to embodiments of the present disclosure is depicted. A neural core 100 is a tileable computational unit that computes one block of an output tensor. A neural core 100 has M inputs and N outputs. In various embodiments, M=N. To compute an output tensor block, a neural core multiplies an M×1 input tensor block 101 with an M×N weight tensor block 102 and accumulates the products into weighted sums that are stored in a 1×N intermediate tensor block 103. A O×N parameter tensor block contains the O parameters that specify each of the N neuron activation functions that are applied to the intermediate tensor block 103 to produce a 1×N output tensor block 105.

Multiple neural cores may be tiled in a neural core array. In some embodiments, the array is 2-dimensional.

A neural network model is a set of constants that collectively specify the entire computation performed by a neural network, including the graph of connections between neurons as well as the weights and activation function parameters for every neuron. Training is the process of modifying the neural network model to perform a desired function.

Inference is the process of applying a neural network to an input to produce an output, without modifying the neural network model.

An inference processing unit is a category of processors that perform neural network inference. A neural inference chip is a specific physical instance of an inference processing unit.

Figure 2:
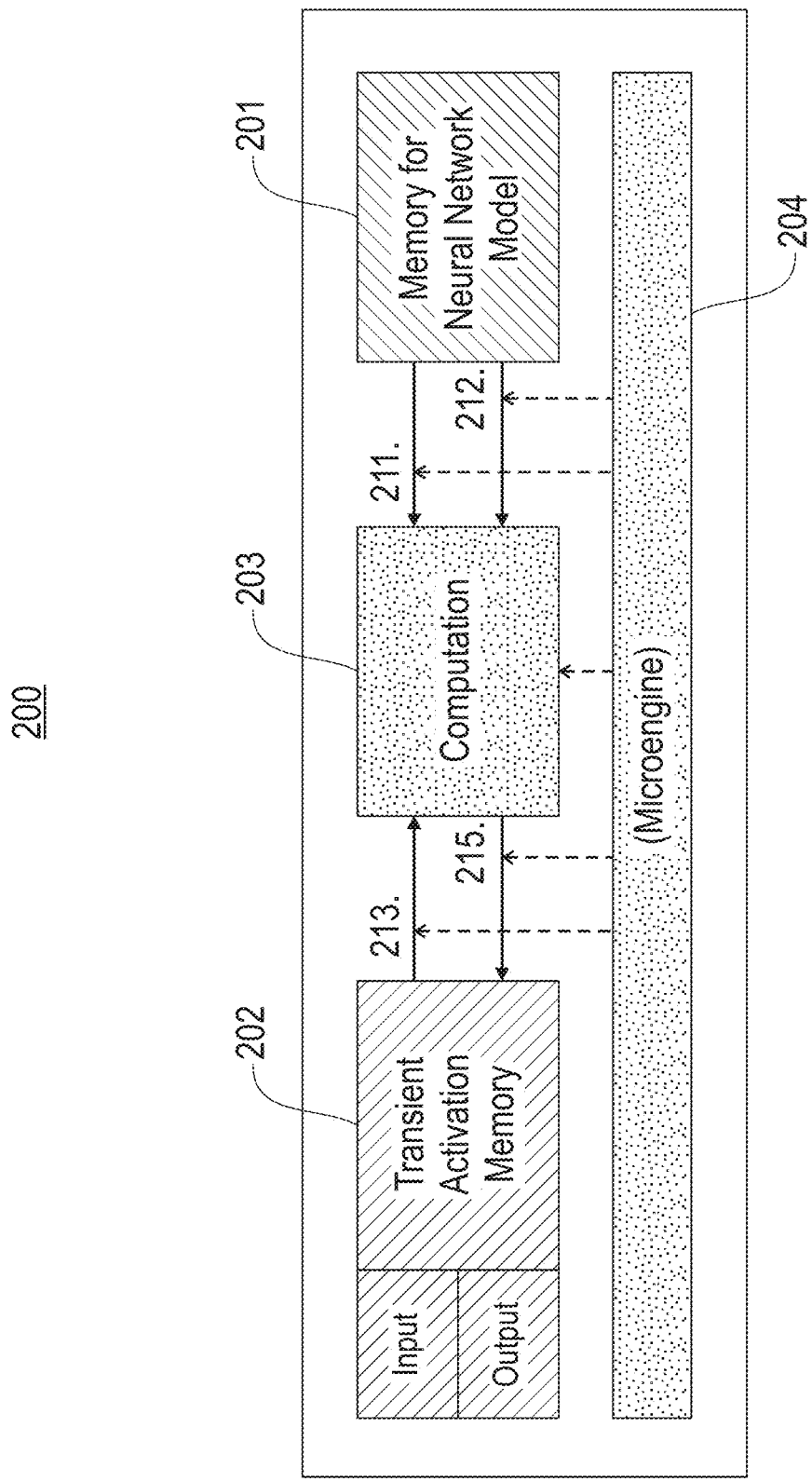
FIG. 2 illustrates an exemplary Inference Processing Unit (IPU) according to embodiments of the present disclosure.

Referring to FIG. 2, an exemplary Inference Processing Unit (IPU) is illustrated according to embodiments of the present disclosure. IPU 200 includes a memory 201 for the neural network model. As described above, the neural network model may include the synapse weights for a neural network to be computed. IPU 200 includes an activation memory 202, which may be transient. Activation memory 202 may be divided into input and output regions, and stores neuron activations for processing. IPU 200 includes a neural computation unit 203, which is loaded with a neural network model from model memory 201. Input activations are provided from activation memory 202 in advance of each computation step. Outputs from neural computation unit 203 are written back to activation memory 202 for processing on the same or another neural computation unit.

In various embodiments a microengine 204 is included in IPU 200. In such embodiments, all operations in the IPU are directed by the microengine. As set out below, central and/or distributed microengines may be provided in various embodiments. A global microengine may be referred to as a chip microengine, while a local microengine may be referred to as a core microengine or local controller. In various embodiments a microengine comprises one or more microengines, microcontrollers, state machines, CPUs, or other controllers.

Figure 3:
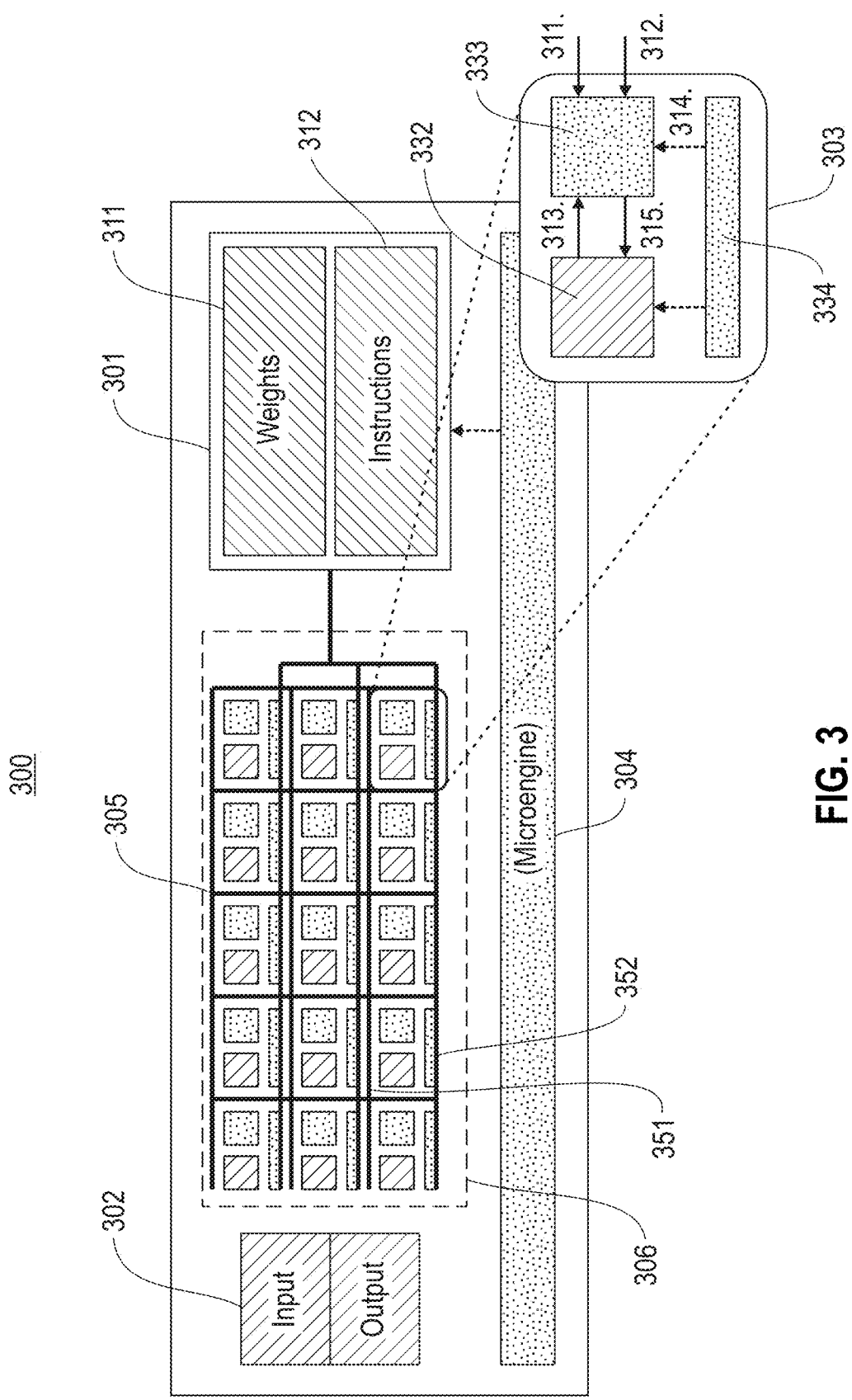
FIG. 3 illustrates a multi-core Inference Processing Unit (IPU) according to embodiments of the present disclosure.

Referring to FIG. 3, a multi-core Inference Processing Unit (IPU) is illustrated according to embodiments of the present disclosure. IPU 300 includes a memory 301 for the neural network model and instructions. In some embodiments, memory 301 is divided into weigh portion 311 and instruction portion 312. As described above, the neural network model may include the synapse weights for a neural network to be computed. IPU 300 includes an activation memory 302, which may be transient. Activation memory 302 may be divided into input and output regions, and stores neuron activations for processing. IPU 300 includes a plurality of cores 303. Each core 303 includes a neural computation unit 333, which is loaded with a neural network model from model memory 301. Each core also include a local activation memory 332. Input activations are provided from local activation memory 332 in advance of each computation step. Outputs from neural computation unit 333 are written back to activation memory 332 for processing on the same or another neural computation unit.

IPU 300 includes an array 306 of neural cores 303. Each core 303 includes a computation unit 333, which is loaded with a neural network model from model memory 301 and is operative to perform vector computation. Each core also includes a local activation memory 332. Input activations are provided from local activation memory 332 in advance of each computation step. Outputs from computation unit 333 are written back to activation memory 332 for processing on the same or another computation unit.

IPU 300 includes one or more network-on-chip (NoC) 305. In some embodiments, a partial sum NoC 351 interconnects the cores 303 and transports partial sums among them. In some embodiments, a separate parameter distribution NoC 352 connects cores 303 to memory 301 for distributing weights and instructions to cores 303. It will be appreciated that various configurations of NoC 351 and 352 are suitable for use according to the present disclosure. For example, broadcast networks, row broadcast networks, tree networks, and switched networks may be used.

In various embodiments a global microengine 304 is included in IPU 300. In various embodiments, a local core controller 334 is included on each core 303. In such embodiments, the direction of operations is shared between the global microengine (chip microengine) and the local core controller (core microengine). In particular, at 311, compute instructions are loaded from model memory 301 to the neural computation unit 333 on each core 303 by global microengine 304. At 312, parameters (e.g., neural network/synaptic weights) are loaded from model memory 301 to the neural computation unit 333 on each core 303 by global microengine 304. At 313, neural network activation data are loaded from activation local activation memory 332 to neural computation unit 333 on each core 303 by local core controller 334. As noted above, the activations are provided to the axons of the particular neural network defined by the model, and may originate from the same or another neural computation unit, or from outside the system. At 314, neural computation unit 333 performs the computation to generate output neuron activations as directed by local core controller 334. In particular, the computation comprises applying the input synaptic weights to the input activations. It will be appreciated that various methods are available for performing such computations, including in silico dendrites, as well as vector multiplication units. At 315, the results from computation are stored in local activation memory 332 as directed by local core controller 334. As described above, these stages may be pipelined, in order to provide efficient usage of the neural computation unit on each core. It will also be appreciated that inputs and outputs may be transferred from local activation memory 332 to global activation memory 302 according to the requirements of a given neural network.

Computation unit 333 performs the computation to generate output neuron activations as directed by local core controller 334. In particular, the computation comprises applying the input synaptic weights to the input activations. It will be appreciated that various methods are available for performing such computations, including in silico dendrites, as well as vector multiplication units. The results from computation are stored in local activation memory 332 as directed by local core controller 334. These stages may be pipelined, in order to provide efficient usage of the computation unit on each core. It will also be appreciated that inputs and outputs may be transferred from local activation memory 332 to global activation memory 302 according to the requirements of a given neural network.

Accordingly, the present disclosure provides for runtime control of operations in an Inference Processing Unit (IPU). In some embodiments, the microengine is centralized (single microengine). In some embodiments, the IPU computation is distributed (performed by an array of cores). In some embodiments, runtime control of operations is hierarchical—both a central microengine and distributed microengines participate.

The microengine or microengines direct the execution of all operations in the IPU. Each microengine instruction corresponds to several sub-operations (e.g., address generation, load, compute, store, etc.) In the distributed case, core microcode is run on the core microengines (e.g., 334). The core microcode includes instruction(s) to execute a full, single tensor operation. For example, a convolution between a weight tensor and a data tensor. In the context of a single core, the core microcode includes instruction(s) to execute a single tensor operation on the locally stored subset of the data tensor (and partial sums). Chip microcode is run on the chip microengine (e.g., 304). Microcode includes instructions to execute all of the tensor operations in a neural network.

Figure 4:
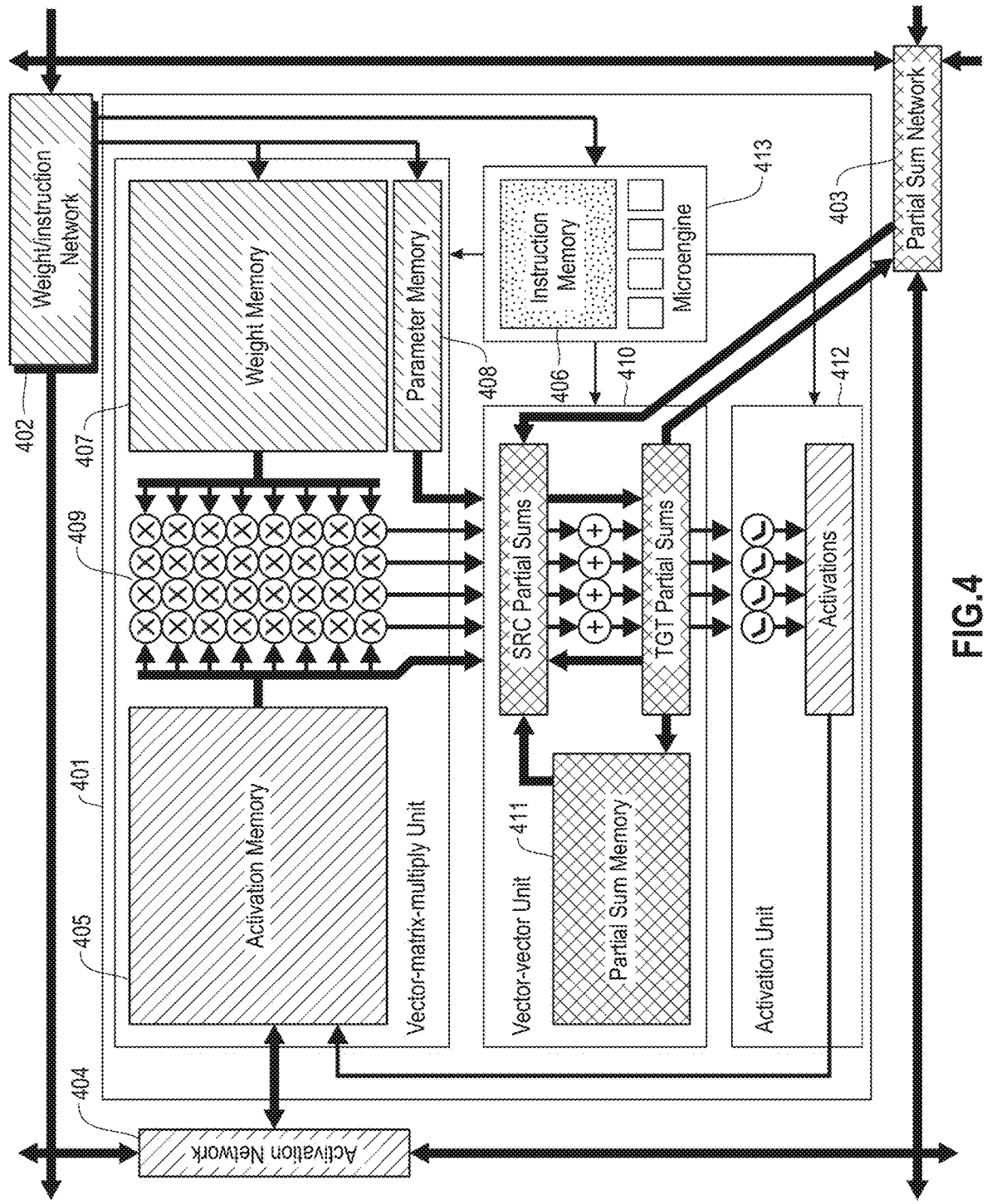
FIG. 4 illustrates a neural core and associated networks according to embodiments of the present disclosure.

With reference now to FIG. 4, an exemplary neural core and associated networks are illustrated according to embodiments of the present disclosure. Core 401, which may be embodied as described with reference to FIG. 1 is interconnected with additional cores by networks 402 . . . 404. In this embodiments, network 402 is responsible for distributing weights and/or instructions, network 403 is responsible for distributing partial sums, and network 404 is responsible for distributing activations. However, it will be appreciated that the various embodiments of the present disclosure may combine these networks, or further separate them into multiple additional networks.

Input activations (X) are distributed core 401 from off-core via activation network 404 to activation memory 405. Layer instructions are distributed to core 401 from off-core via weight/instruction network 402 to instruction memory 406. Layer weights (W) and/or parameters are distributed to core 401 from off-core via weight/instruction network 402 to weight memory 407 and/or parameter memory 408.

The weight matrix (W) is read from weight memory 407 by Vector Matrix Multiply (WM) unit 409. The activation vector (V) is read from activation memory 405 by Vector Matrix Multiply (WM) unit 409. Vector Matrix Multiply (WM) unit 409 then computes vector-matrix multiplication $Z=X^TW$ and provides the result to Vector-Vector unit 410. Vector-Vector unit 410 reads additional partial sums from partial sum memory 411, and receives additional partial sums from off-core via partial sum network 403. A vector-vector operation is computed by Vector-Vector unit 410 from these source partial sums. For example, the various partial sums may in turn be summed. The resulting target partial sums are written to partial sum memory 411, sent off-core via partial sum network 403, and/or fed back for further processing by Vector-Vector unit 410.

The partial sum results from Vector-Vector unit 410, after all computation for a given layer's inputs is complete, are provided to activation unit 412 for the computation of output activations. The activation vector (Y) is written to activation memory 405. Layer activations (including the results written to activation memory) are redistributed across cores from activation memory 405 via activation network 404. Upon receipt, they are written to local activation memory to each receiving core. Upon completion of processing for a given frame, the output activations are read from activation memory 405 and sent off-core via network 404.

Low-precision computation has certain advantages with respect to power, performance, and area. In particular, less energy is required per operation. Higher operation frequency is achievable (due to fewer levels of logic). A smaller circuit implementation area is needed.

However, low-precision computation also has certain disadvantages. There is the potential for loss of accuracy. For example, for networks that are trained for higher precision, there may be losses where inference is performed in low precision.

To addresses these conflicting goals, the present disclosure provides for flexible precision in neural inference, combining the advantages of both high and low precision computation. In various embodiments, high-precision computation is performed when/where needed, and low-precision when/where performance can use it.

In various embodiments, a flexible precision computation unit is provided, including a flexible precision Vector-Matrix Multiplier (VMM), a flexible prevision vector unit, and a flexible precision activation function unit. In various embodiments, flexible precision data transmission is provided, including flexible precision activation, weight, and partial sum buses or networks. In various embodiments, flexible prevision storage is provided, including activation, weight, and partial sum memory. In various embodiments, conversion between precisions is provided, including reformatting of values from compute to memory.

In some exemplary embodiments, the VMM converts from flexible precision (e.g., 8 bit/4 bit/2 bit) to high, fixed-precision output (e.g., 32 bit). In such embodiments, the Vector Unit is high, fixed precision (e.g., 32 bits). The activation function unit converts from high, fixed precision (e.g., 32 bit) input to flexible precision (e.g., 8 bit/4 bit/2 bit) output. The activation functions are used as squashing/re-ranging functions.

In other exemplary embodiments, the VMM converts from flexible precision (e.g., 8 bit/4 bit/2 bit) to a higher, also flexible-precision (e.g., 32 bit/16 bit/8 bit) internal representation. In such embodiments, the Vector Unit is high, flexible precision (e.g., 32 bit/16 bit/8 bit) and the activation function unit is high, flexible precision (e.g., 32 bit/16 bit/8 bit) input to low, flexible precision output (e.g., 8 bit/4 bit/2 bit). The activation functions are used as squashing/re-ranging functions.

In an exemplary flexible precision VMM, the VMM Unit performs the operation: $Z=X^T W$, supports input precisions (X, W) of 8 bit/4 bit/2 bit, and always outputs precision (Z) of 32 bit. Referring to Table 1, the VMM inputs and outputs are shown. Referring to Table 2, the weight sizes for each configuration are provided.

TABLE 1

| Primitive | Function | Input 1 | Input 2 | Output |
|---|---|---|---|---|
| Vector-matrix multiply | $z_j = \Sigma_i x_i w_{i,j}$ | 8-bit $x_i$ | 8-bit $w_{i,j}$ | 32-bit $z_j$ |
| Vector-matrix multiply | $z_j = \Sigma_i x_i w_{i,j}$ | 4-bit $x_i$ | 4-bit $w_{i,j}$ | 32-bit $z_j$ |
| Vector-matrix multiply | $z_j = \Sigma_i x_i w_{i,j}$ | 2-bit $x_i$ | 2-bit $w_{i,j}$ | 32-bit $z_j$ |

TABLE 2

| Precision | Dimensions | Cycles | W size (Bytes) | W size |
|---|---|---|---|---|
| INT8: 8 b X, 8 b W | 32 × 32 | 1 | 8 b*32*32/8 b per B = 1024 B | full block |
| INT4: 4 b X, 4 b W | 64 × 32 | 1 | 4 b*64*32/8 b per B = 1024 B | half block |
| INT8: 2 b X, 2 b W | 128 × 32 | 1 | 2 b*128*32/8 b per B = 1024 B | quarter block |

In an exemplary activation function unit, the input precision (Z) is 32 bit, and output precisions (Y) of 8 bit/4 bit/2 bit are supported. To provides flexible precision, activation function computation is performed in two stages. In stage 1, the activation function is computed using 32 bit input precision and 8 bit output precision. In stage 2, the 8 bit output is rounded to the appropriate precision if required (keeping the most significant 4 or 2 bits of the 8 bit output). Referring to Table 3, the precision conversion in various configurations is illustrated.

TABLE 3

| Index | Input Precision ($x_i w_{i,j}$) | Partial Sum (zj) | act fx stage 1 output ($u_j$) | Output Precision | Output ($y_j$) | Output Cycles (256 wires) | Precision Conversion |
|---|---|---|---|---|---|---|---|
| 0 | INT8: 8b X, 8b W | 32b $z_j$ | $u_j[7:0]$ | 8b (single) | $y_j[7:0] = u_j[7:0]$ | 1 | same |
| 0 | INT4: 4b X, 4b W | 32b $z_j$ | $u_j[7:0]$ | 8b (single) | $y_j[7:0] = u_j[7:0]$ | 1 | up |
| 0 | INT2: 2b X, 2b W | 32b $z_j$ | $u_j[7:0]$ | 8b (single) | $y_j[7:0] = u_j[7:0]$ | 1 | up |
| 1 | INT8: 8b X, 8b W | 32b $z_j$ | $u_j[7:0]$ | 4b (single) | $y_j[3:0] = u_j[7:4]$ | 1 | down |
| 1 | INT4: 4b X, 4b W | 32b $z_j$ | $u_j[7:0]$ | 4b (single) | $y_j[3:0] = u_j[7:4]$ | 1 | same |
| 1 | INT2: 2b X, 2b W | 32b $z_j$ | $u_j[7:0]$ | 4b (single) | $y_j[3:0] = u_j[7:4]$ | 1 | up |
| 2 | INT8: 8b X, 8b W | 32b $z_j$ | $u_j[7:0]$ | 2b (single) | $y_j[1:0] = u_j[7:6]$ | 1 | down |
| 2 | INT4: 4b X, 4b W | 32b $z_j$ | $u_j[7:0]$ | 2b (single) | $y_j[1:0] = u_j[7:6]$ | 1 | down |
| 2 | INT2: 2b X, 2b W | 32b $z_j$ | $u_j[7:0]$ | 2b (single) | $y_j[1:0] = u_j[7:6]$ | 1 | same |
| 3 | INT8: 8b X, 8b W | 32b $z_j$ | — | 32b (quad) | $y_j[31:0] = z_j[31:0]$ | 4 | full PS precision |
| 3 | INT4: 4b X, 4b W | 32b $z_j$ | — | 32b (quad) | $y_j[31:0] = z_j[31:0]$ | 4 | full PS precision |
| 3 | INT2: 2b X, 2b W | 32b $z_j$ | — | 32b (quad) | $y_j[31:0] = z_j[31:0]$ | 4 | full PS precision |

The quad precision (4× activation memory, index 3 above) selection is used for full precision readout of partial sum values as neuron output. This is used for functions such as linear regression. When quad output precision is selected, the Activation Function computation is ignored. Instead, the full 32 bit $z_j$ is directly assigned to the quad (32 bit) $y_j$ output. The quad precision readout mode requires 4 cycles to perform readout, limiting to 4 cycles between back-to-back operations.

In various embodiments, the activation functions are designed by construction as saturating functions to avoid overflow and underflow. The saturating functions use the full 32 bit $z_j$ for floor/ceiling bound checking. They saturate at:
INT8: 0 and 255 (unsigned)
INT8: −127 and 127 (signed)
INT4: 0 and 15 (unsigned)
INT4: −7 and 7 (signed)
INT2: 0 and 3 (unsigned)
INT2: −1 and 1 (signed)

The output precision conversion functions avoid overflow and underflow by converting after the saturating activation functions. The saturating activation function uses the same 8 bit $u_j$ range in all cases, and then rounds off the least significant bits for the appropriate output precision.

Exemplary saturating functions include binary, trinary, sigmoid, tan h, bounded ReLU, bound LU, and others known in the art.

Figure 5:
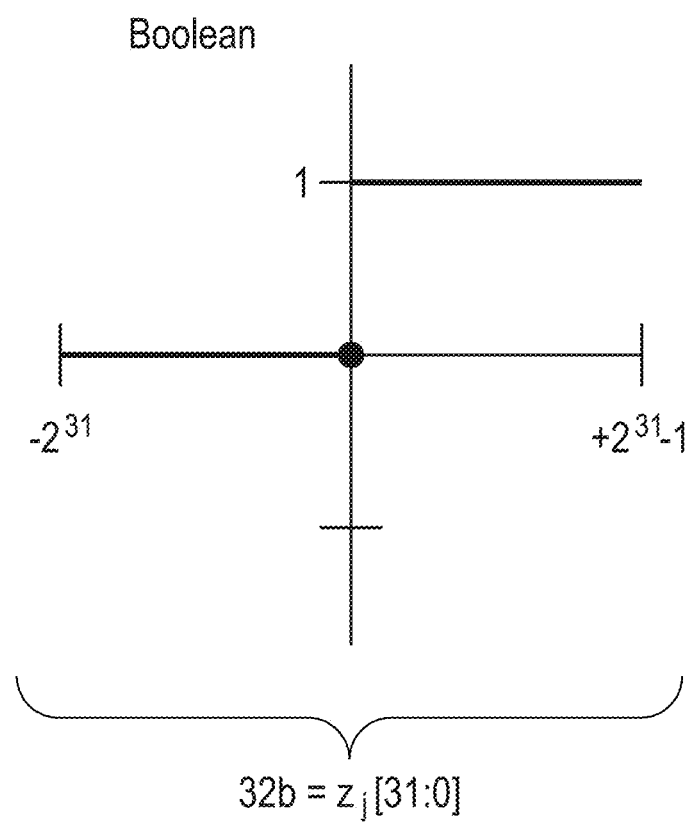
FIG. 5 depicts a Boolean function according to embodiments of the present disclosure.
Figure 6:
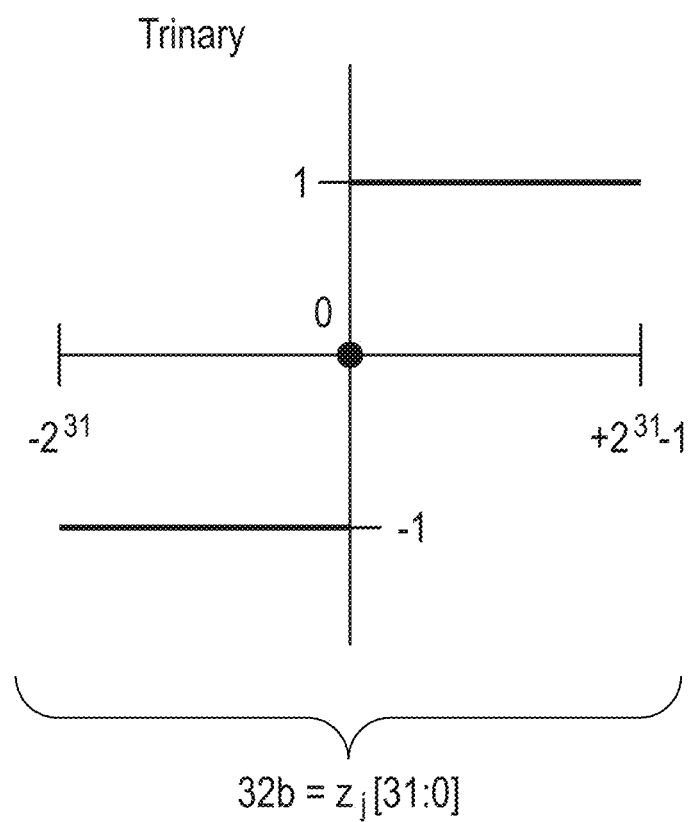
FIG. 6 depicts a trinary function according to embodiments of the present disclosure.
Figure 7:
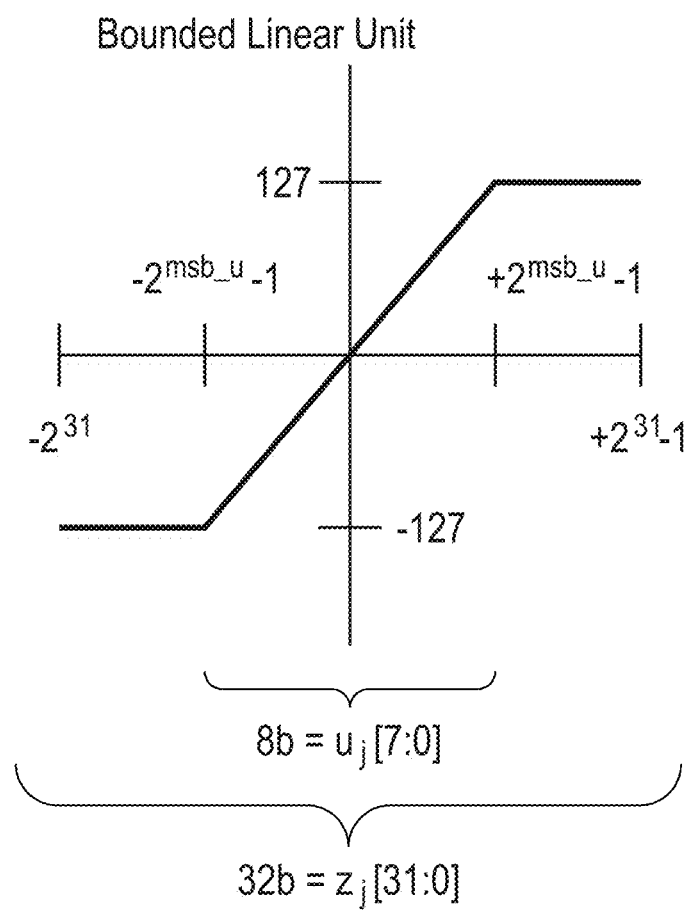
FIG. 7 depicts a bounded linear unit according to embodiments of the present disclosure.
Figure 8:
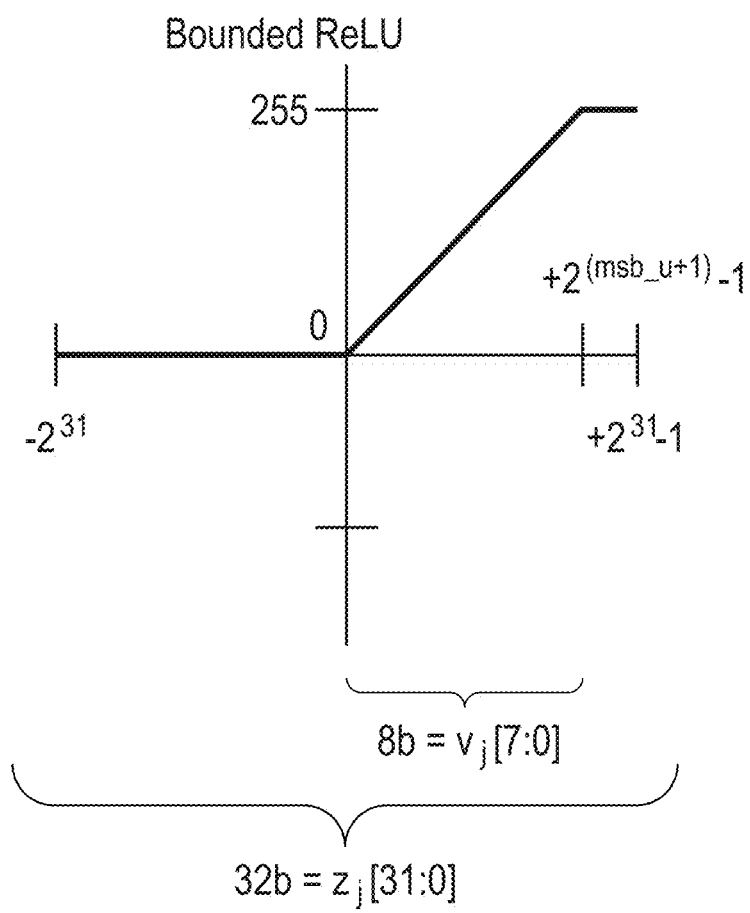
FIG. 8 depicts a bounded ReLU according to embodiments of the present disclosure.
Figure 9:
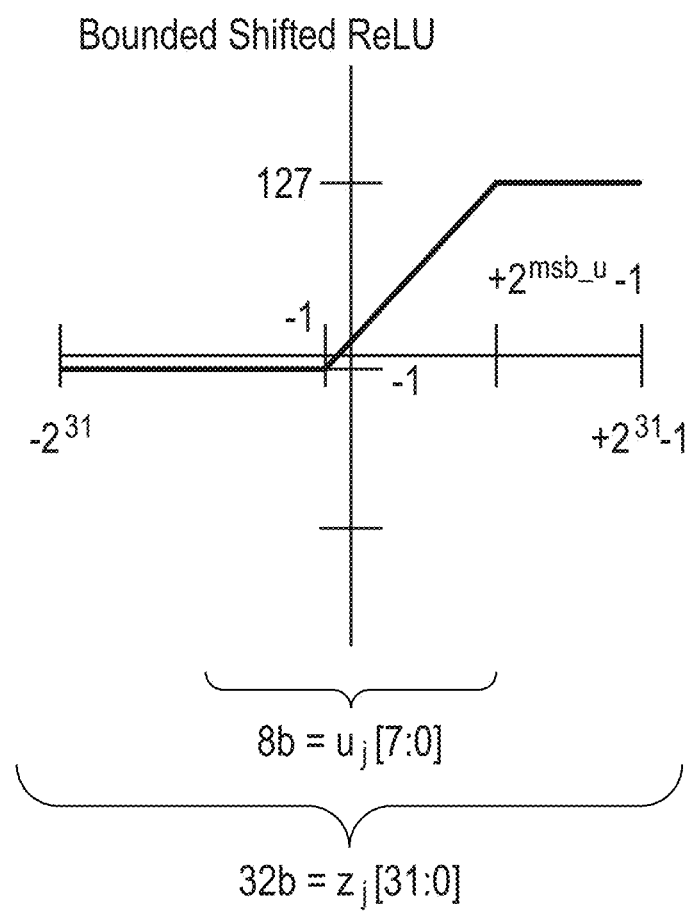
FIG. 9 depicts a bounded shifted ReLU according to embodiments of the present disclosure.
Figure 10:
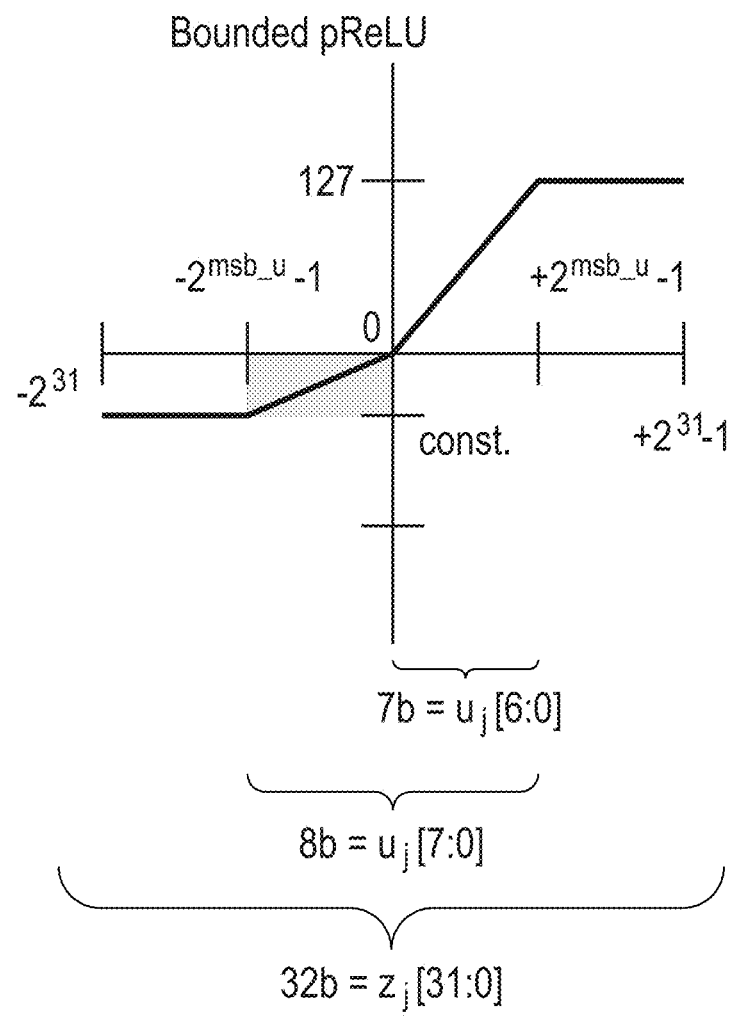
FIG. 10 depicts a bounded pReLU according to embodiments of the present disclosure.
Figure 11:
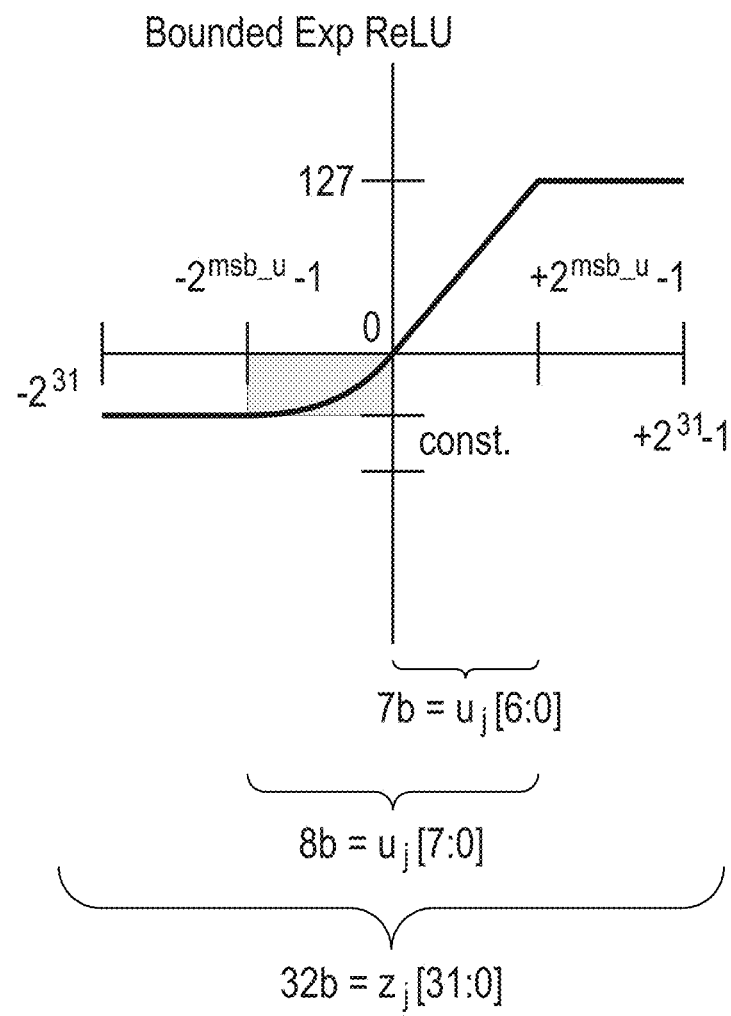
FIG. 11 depicts a bounded exp ReLU according to embodiments of the present disclosure.
Figure 12:
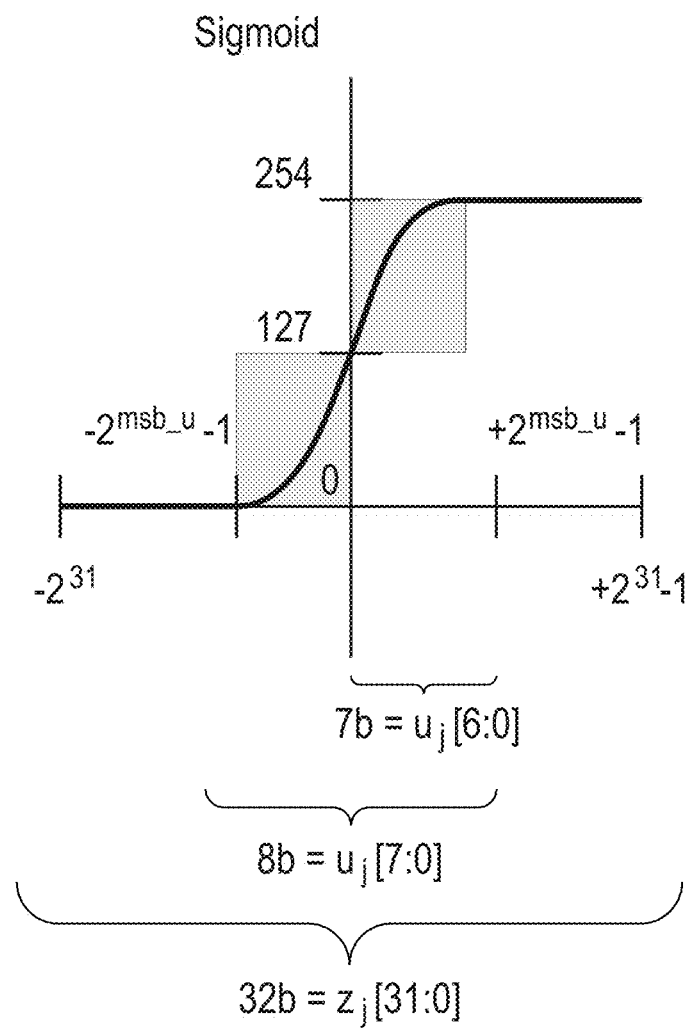
FIG. 12 depicts a sigmoid function according to embodiments of the present disclosure.
Figure 13:
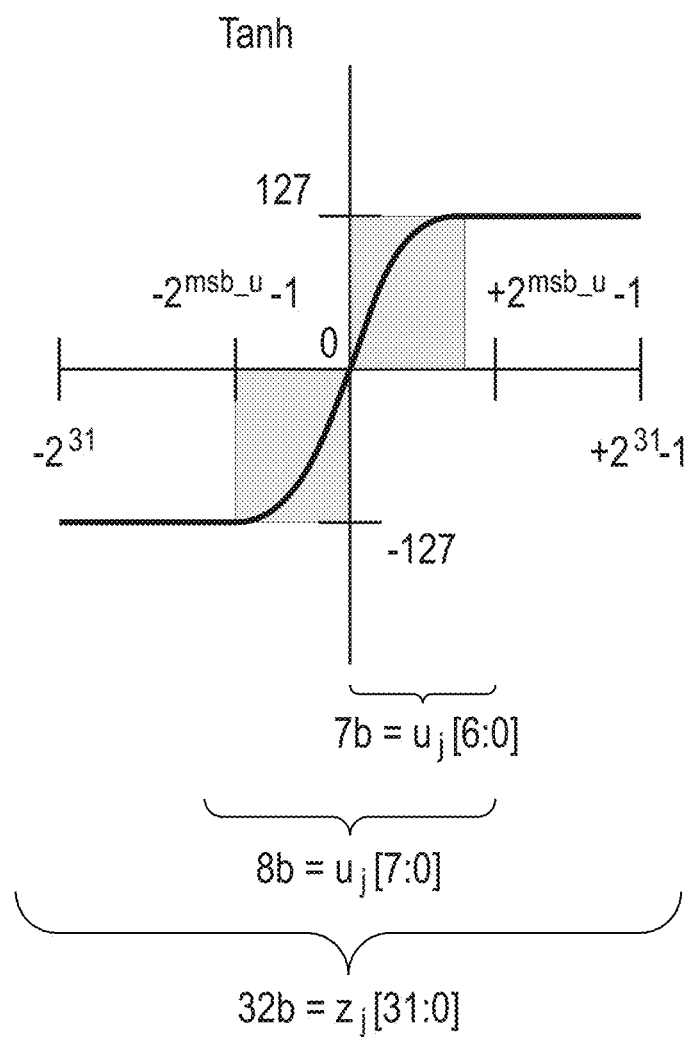
FIG. 13 depicts a tan h function according to embodiments of the present disclosure.

Referring to FIGS. 5-13, exemplary activation functions are illustrated according to the present disclosure. These activation transfer function shapes perform re-ranging. They are well suited for multiple precisions. FIG. 5 depicts a Boolean function. FIG. 6 depicts a trinary function. FIG. 7 depicts a bounded linear unit. FIG. 8 depicts a bounded ReLU. FIG. 9 depicts a bounded shifted ReLU. FIG. 10 depicts a bounded pReLU. FIG. 11 depicts a bounded exp ReLU. FIG. 12 depicts a sigmoid function. FIG. 13 depicts a tan h function.

In various embodiments, flexible precision communication and storage is provided. The same networks and memories support all precisions (e.g., 8 bit/4 bit/2 bit) by changing the format of the data, using the same underlying physical substrate. In various embodiments, the overall network bandwidth (e.g., expressed in the number of wires on a bus) is maintained constant, while the number of elements and precision vary. In particular, the overall network usage is given by the number of elements multiplied by the precision. In this way, ongoing adjustments may be made to precision and element count while using a target amount of bandwidth (e.g., all available wires). Likewise, in various embodiments, overall storage utilization is maintained constant, while the number of elements and precision vary.

In various embodiments, the weight NoC supports precisions of 8 bit/4 bit/2 bit. In some embodiments, a 512 wire bus is provided, supporting 64 elements at 8 bit, 128 elements at 4 bit, and 256 elements at 2 bit.

In various embodiments, the activation NoC supports precisions of 8 bit/4 bit/2 bit. In some embodiments, a 256 wire bus is provided, supporting 32 elements at 8 bit, 64 elements at 4 bit, and 128 elements at 2 bit.

In various embodiments, the weight memory is organized as 4096 read data wires. In such embodiments, the 4096 wires support 32×16 elements at 8 bit, 64×16 elements at 4 bit, and 128×16 elements at 2 bit.

In various embodiments, the activation memory is organized as 256 read data wires. In such embodiments, the 256 wires support 32 elements at 8 bit, 64 elements at 4 bit, and 128 elements at 2 bit.

Figure 14:
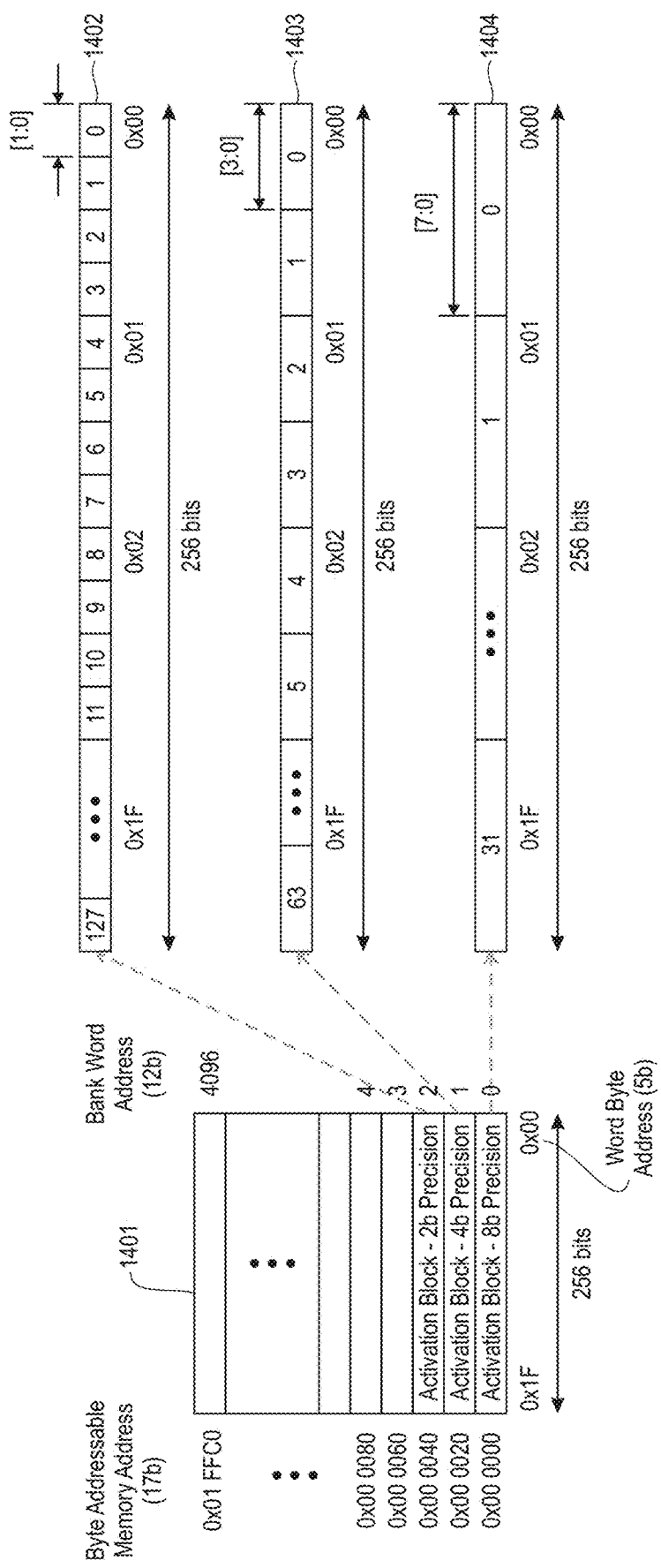
FIG. 14 illustrates a flexible precision activation memory according to embodiments of the present disclosure.

Referring now to FIG. 14, an activation memory is illustrated according to embodiments of the present disclosure. Activation memory 1401 supports 8 bit/4 bit/2 bit format. As shown, an activation block 1402 with 2 bit precision, an activation block 1403 with 4 bit precision, and an activation block with 8 bit precision are supported.

Figure 15:
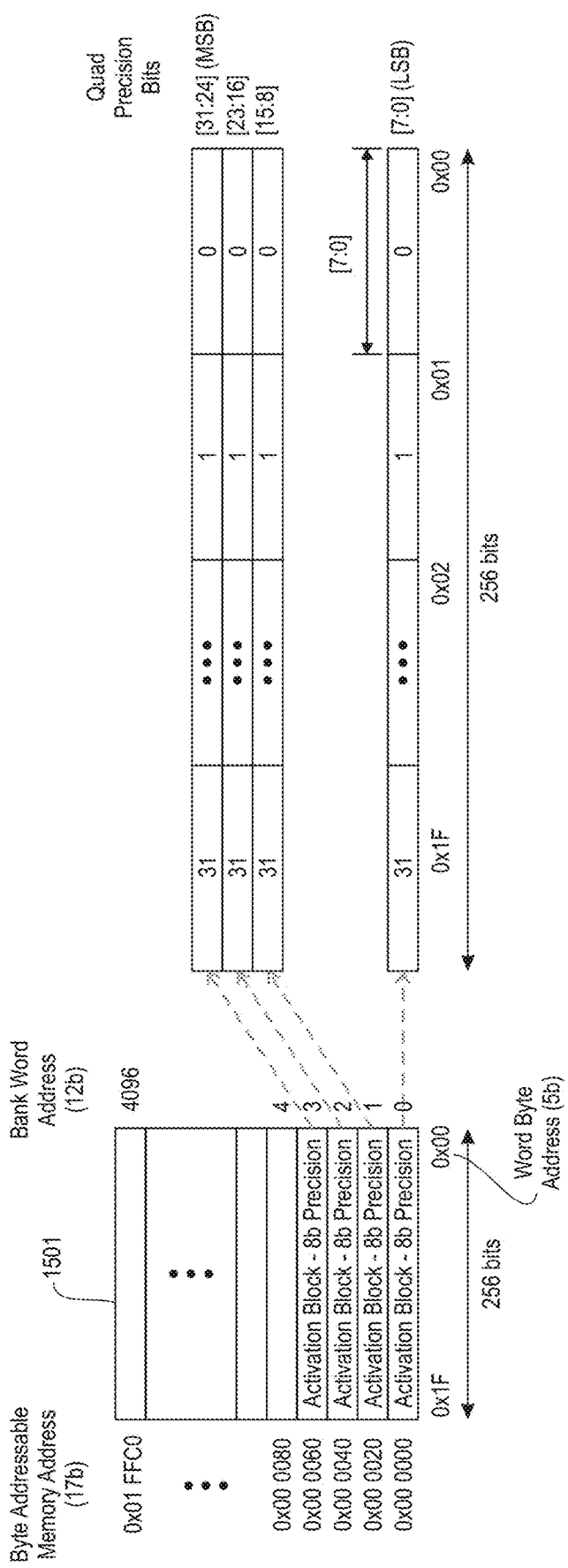
FIG. 15 illustrates a flexible precision activation memory according to embodiments of the present disclosure.

Referring now to FIG. 15, an activation memory is illustrated according to embodiments of the present disclosure, in this example, activation memory 1501 uses a quad precision (32 bit) format. In this example, the activation block spans multiple bank word addresses.

Figure 16:
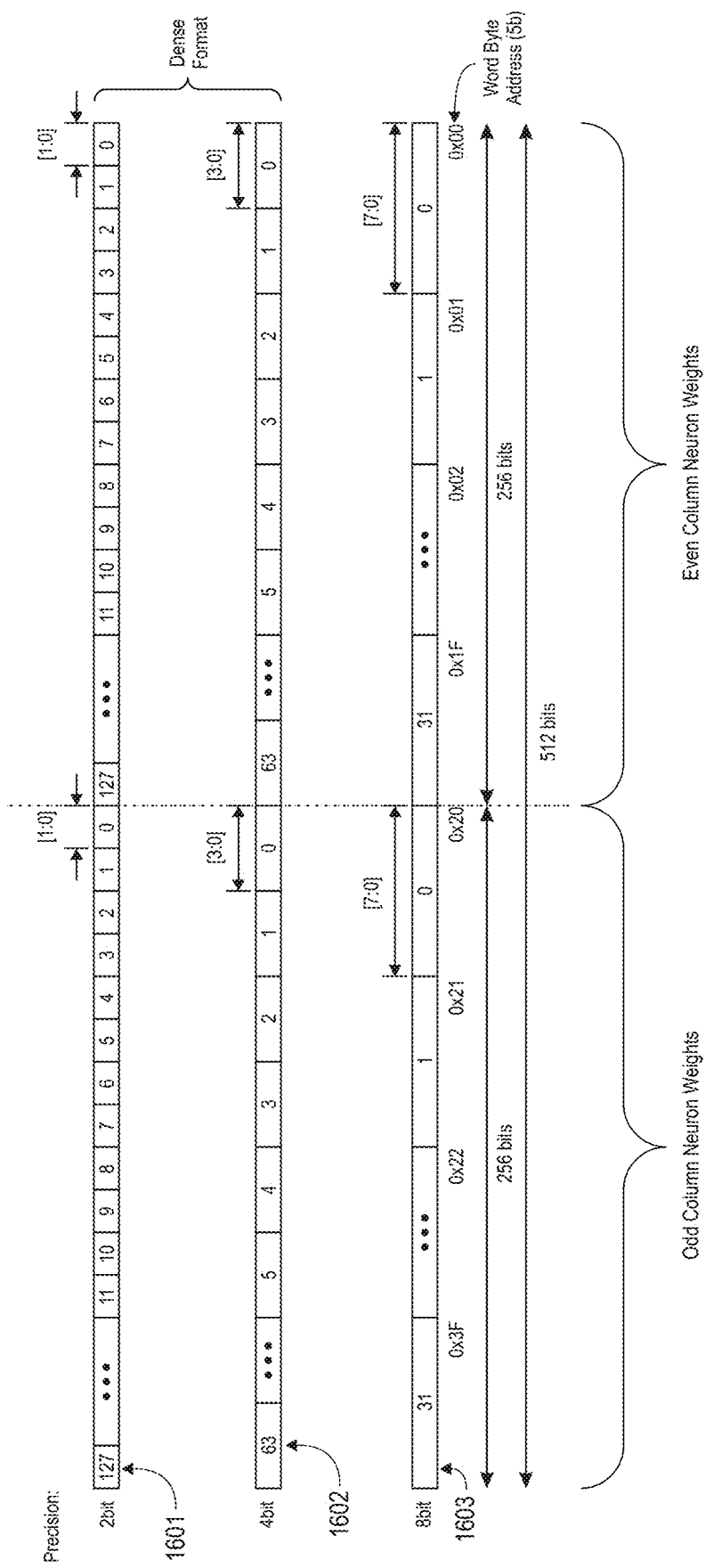
FIG. 16 illustrates a flexible precision weight memory according to embodiments of the present disclosure.

Referring now to FIG. 16, a weight memory is illustrated according to embodiments of the present disclosure. As shown, a 2 bit format 1601, 4 bit format 1602, and 8 bit format 1603 are supported.

In various embodiments an activation function unit output is 32 elements×8 bit, 4 bit, or 2 bit. However, the activation word size is 32 elements at 8 bit, 64 elements at 4 bit, or 128 elements at 2 bit. For low-precision computation multiple activation function unit output words are combined as follows: 1×32 elements at 8 bit, 2×64 elements at 4 bit, or 4×128 elements at 2 bit.

To accommodate this reformatting, in various embodiments, sub vectors [127:0] at 4 bit or [63:0] at 2 bit are stored in a register prior to writing the full activation vector [255:0] back to memory. At 8 bit, 1 cycle accommodates the full activation vector. At 4 bit, 2 cycles accommodate the full activation vector, where cycle 1 covers bits 127:0 and cycle 2 covers bits 255:128. At 2 bit, 4 cycles accommodate the full activation vector, where cycle 1 covers bits 63:0, cycle 2 covers bits 127:64, cycle 3 covers bits 191:128, and cycle 4 covers bits 255:192.

In various embodiments, partial full vectors are zero padded, where zeros go into the unspecified sub vector elements. A full vector can be written back to memory even if not all of the sub vectors have been specified. Unused sub vector slots are zeros. This reduces computation time for 4 bit 2 bit precision networks where the full dimension of the activation vector is not required. For example, in 2 bit mode, if the output activation vector is only 64 elements, only two cycles of computation are required.

Figure 17:
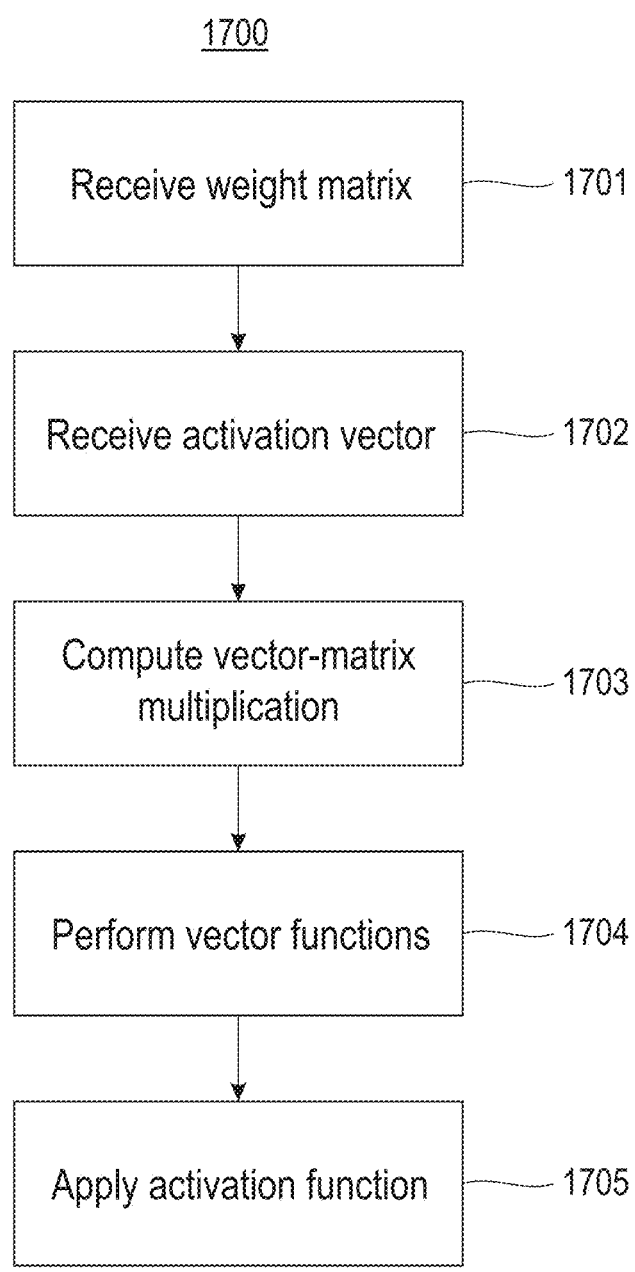
FIG. 17 illustrates a method of flexible precision neural processing according to embodiments of the present disclosure.

Referring to FIG. 17, a method of flexible precision neural processing is illustrated according to embodiments of the present disclosure. At 1701, a weight matrix having a first precision is received. At 1702, an activation vector is received having the first precision. At 1703, a vector-matrix multiplication is computed of the weight matrix and the activation vector, yielding a partial sum vector a second precision. At 1704, one or more vector functions is performed on the partial sum vector to yield a vector processor output vector having the second precision. At 1705, an activation function is applied to the vector processor output vector, yielding an output activation vector having a third precision. At least one of the first, second, and third precision is varied at runtime.

Figure 18:
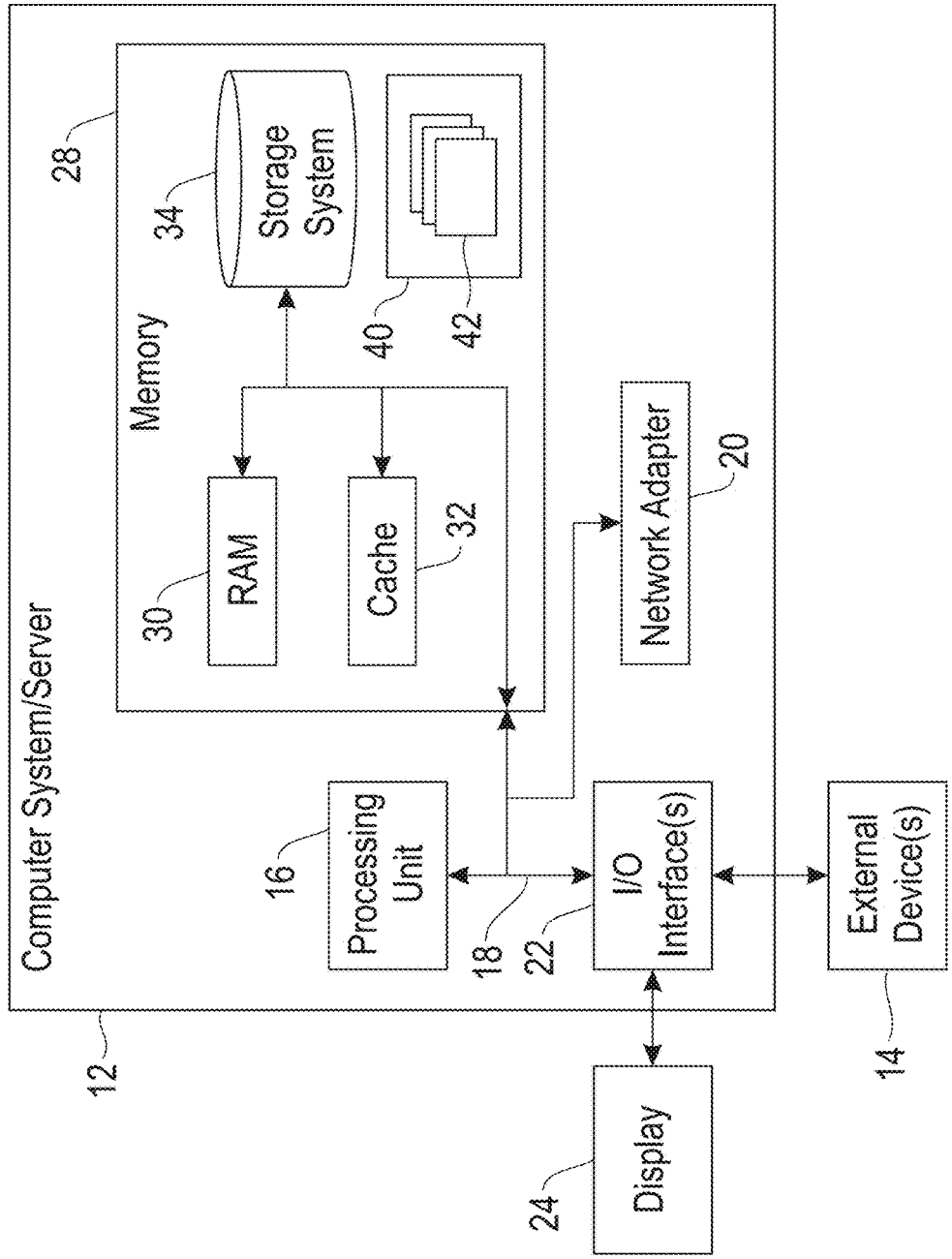
FIG. 18 depicts a computing node according to embodiments of the present disclosure.

Referring now to FIG. 18, a schematic of an example of a computing node is shown. Computing node 10 is only one example of a suitable computing node and is not intended to suggest any limitation as to the scope of use or functionality of embodiments described herein. Regardless, computing node 10 is capable of being implemented and/or performing any of the functionality set forth hereinabove.

In computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 18, computer system/server 12 in computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus, Peripheral Component Interconnect Express (PCIe), and Advanced Microcontroller Bus Architecture (AMBA).

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the disclosure.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

The present disclosure may be embodied as a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A neural inference chip comprising a neural core, the neural core comprising:
    a vector-matrix multiplier adapted to
        receive a weight matrix having a weight matrix precision,
        receive an input activation vector having an input activation vector precision, and
        compute a partial sum vector by multiplying the input activation vector by the weight matrix, the partial sum vector having a partial sum vector precision;
    a vector processor adapted to
        receive one or more partial sum vector from one or more vector source, the one or more vector source including the vector-matrix multiplier, and
        perform one or more vector function on the one or more partial sum vector to yield a vector processor output vector, the vector processor output vector having a precision equal to the partial sum vector precision; and
    an activation unit operatively coupled to the vector processor and adapted to
        apply an activation function to the vector processor output vector, yielding an output activation vector having an output activation precision, wherein the vector-matrix multiplier, vector processor, and/or activation unit is adapted to operate at variable precision.

2. The neural inference chip of claim 1, further comprising:
    at least one network interconnecting the neural core with at least one additional neural core, the at least one network adapted to deliver synaptic weights and/or input activations to the neural cores at variable precision.

3. The neural inference chip of claim 2, wherein the at least one network is further adapted to vary the weight matrix precision and dimension, input activation vector precision and dimension, and/or the output activation vector precision and dimension while maintaining constant bandwidth.

4. The neural inference chip of claim 1, wherein the neural core further comprises:
at least one memory, the at least one memory being adapted to store weight matrices, input activation vectors, and/or output activation vectors at variable precision.

5. The neural inference chip of claim 4, wherein the at least one memory is further adapted to vary the weight matrix precision and dimension, input activation vector precision and dimension, and/or the output activation vector precision and dimension while maintaining constant storage utilization.

6. The neural inference chip of claim 1, wherein the vector-matrix multiplier is further adapted to vary the weight matrix precision and dimension and/or the input activation vector precision and dimension while maintaining constant bandwidth.

7. The neural inference chip of claim 6, wherein the vector-matrix multiplier is further adapted to compute a variable number of multiplications per cycle at variable precision, wherein the variable number of multiplications per cycle and variable precision are inversely proportional.

8. The neural inference chip of claim 1, wherein the activation function is adapted to re-range the vector processor output vector.

9. The neural inference chip of claim 8, wherein applying the activation function comprises applying a saturating function.

10. The neural inference chip of claim 9, wherein the saturating function has as least one bound corresponding to the output activation precision.

11. The neural inference chip of claim 8, wherein applying the activation function comprises truncating one or more least significant bits.

12. The neural inference chip of claim 1, wherein the variable precision is selected from 2 bit, 4 bit, 8 bit, 16 bit, and 32 bit.

13. The neural inference chip of claim 1, wherein the variable precision is selectable at runtime.

14. The neural inference chip of claim 1, wherein the variable precision is selectable for each layer of a neural network.

15. The neural inference chip of claim 1, wherein the weight matrix precision is equal to the activation vector precision.

16. The neural inference chip of claim 15, wherein the partial sum vector precision is not equal to the output activation precision.

17. The neural inference chip of claim 1, wherein the partial sum vector precision is higher than the weight matrix precision and/or the activation vector precision.

18. The neural inference chip of claim 15, wherein the output activation precision is equal to the weight matrix precision.

19. A method comprising:
receiving a weight matrix having a first precision;
receiving an activation vector having the first precision;
computing a vector-matrix multiplication of the weight matrix and the activation vector,
yielding a partial sum vector a second precision;
performing one or more vector functions on the partial sum vector to yield a vector processor output vector having the second precision; and
applying an activation function to the vector processor output vector, yielding an output activation vector having a third precision, wherein at least one of the first, second, and third precision is varied at runtime.

20. The method of claim 19, further comprising:
varying at least one of the first, second, and third precision for computation of each layer of a neural network.

* * * * *